United States Patent
Breuer et al.

(10) Patent No.: US 11,930,407 B2
(45) Date of Patent: Mar. 12, 2024

(54) METHOD FOR OPERATING A USER EQUIPMENT SUPPORTING SELF ORGANIZING NETWORKS

(71) Applicant: Telit Cinterion Deutschland GmbH, Munich (DE)

(72) Inventors: Volker Breuer, Botzow (DE); Uwe Dummann, Panketal (DE)

(73) Assignee: Telit Cinterion Deutschland GmbH, Munich (DE)

( * ) Notice: Subject to any disclaimer, the term of this patent is extended or adjusted under 35 U.S.C. 154(b) by 438 days.

(21) Appl. No.: 17/286,842

(22) PCT Filed: Oct. 28, 2019

(86) PCT No.: PCT/EP2019/079423
§ 371 (c)(1),
(2) Date: Apr. 20, 2021

(87) PCT Pub. No.: WO2020/089179
PCT Pub. Date: May 7, 2020

(65) Prior Publication Data
US 2021/0352538 A1    Nov. 11, 2021

(30) Foreign Application Priority Data

Oct. 29, 2018 (EP) ..................... 18203099

(51) Int. Cl.
*H04W 36/00* (2009.01)
*H04W 36/08* (2009.01)
*H04W 76/30* (2018.01)

(52) U.S. Cl.
CPC . *H04W 36/0058* (2018.08); *H04W 36/00835* (2018.08); *H04W 36/00837* (2018.08);
(Continued)

(58) Field of Classification Search
CPC ....... H04W 36/0058; H04W 36/00835; H04W 36/00837; H04W 36/0094; H04W 36/08;
(Continued)

(56) References Cited

U.S. PATENT DOCUMENTS

| 2013/0170362 A1* | 7/2013 | Futaki ................ H04W 24/10 370/241.1 |
| 2013/0189990 A1 | 7/2013 | Kim et al. |

(Continued)

FOREIGN PATENT DOCUMENTS

WO      2013133749 A1    9/2013

OTHER PUBLICATIONS

"ANR for NR"; LG Electronics, Inc .; 3GPP TSG-RAN2 NR AH#3 R2-1801424 Vancouver, Canada, Jan. 22-26, 2018 (Year: 2018).*
(Continued)

*Primary Examiner* — Benjamin H Elliott, IV
(74) *Attorney, Agent, or Firm* — PEARL COHEN ZEDEK LATZER BARATZ LLP

(57) ABSTRACT

A method for operating a user equipment in a cellular network, the cellular network comprising a plurality of base stations, wherein at least one base station is configured to maintain neighbor relation data, wherein the user equipment is operating with an active base station in narrowband communication category, the method including, for the user equipment—receiving from the active base station a measurement instruction message, the measurement instruction message containing at least one restriction parameter relating to at least one of a reporting time indication and a minimum power level indicator, —receiving a connection release message, —measuring signals from at least one neighbor base station considering the at least one restriction
(Continued)

parameter, and, on occasion of a reconnection—transmitting at least one neighbor measurement report to the active base station.

15 Claims, 4 Drawing Sheets

(52) U.S. Cl.
CPC ....... *H04W 36/0094* (2013.01); *H04W 36/08* (2013.01); *H04W 76/30* (2018.02)

(58) Field of Classification Search
CPC ..... H04W 76/30; H04W 76/19; H04W 24/10; Y02D 30/70
See application file for complete search history.

(56) References Cited

U.S. PATENT DOCUMENTS

| | | | | |
|---|---|---|---|---|
| 2014/0149262 | A1* | 5/2014 | Parekh | H04L 43/0882 709/224 |
| 2015/0201337 | A1* | 7/2015 | Hwang | H04W 24/10 455/67.11 |
| 2016/0029253 | A1* | 1/2016 | Sarkar | H04W 36/0016 455/436 |
| 2017/0070896 | A1* | 3/2017 | Shindo | H04W 36/0079 |
| 2017/0188276 | A1* | 6/2017 | Melin | H04W 36/00835 |
| 2019/0021021 | A1* | 1/2019 | Thangarasa | H04W 4/70 |
| 2019/0053138 | A1* | 2/2019 | Wu | H04W 48/16 |
| 2019/0132777 | A1* | 5/2019 | Park | H04B 17/309 |
| 2019/0357100 | A1* | 11/2019 | Ramachandra | H04W 36/0094 |
| 2020/0359251 | A1* | 11/2020 | Gunnarsson | H04W 56/007 |
| 2020/0396632 | A1* | 12/2020 | Ramachandra | H04W 24/10 |
| 2021/0120481 | A1* | 4/2021 | Cheng | H04W 48/10 |
| 2021/0306892 | A1* | 9/2021 | Li | H04W 24/10 |
| 2021/0352538 | A1* | 11/2021 | Breuer | H04W 36/00835 |
| 2022/0167229 | A1* | 5/2022 | Chou | H04W 24/02 |

OTHER PUBLICATIONS

"Inter-RAT/Frequency Automatic Neighbor Relation Measurements"; Ericsson; 3GPP TSG-RAN WG3 Meeting #59 R3-080296 Feb. 11-15, 2008 Sorrento, Italy (Year: 2008).*

"Automatic Neighbor Relation function"; Huawei; 3GPP TSG RAN WG3 Meeting #59 R3-080365 Sorrento, Italy, Feb. 11-15, 2008 (Year: 2008).*

"Inter-RAT Measurements for E-CID"; Ericsson; 3GPP TSG-RAN WG3 #100 R3-182768 Busan, South Korea, May 21-25, 2018 (Year: 2018).*

3GPP TSG RAN WG3 Meeting #59 R3-080366 Feb. 11-15, 2008, Sorrento, Italy (Year: 2008).*

"Self-Optimizing Networks: The Benefits of SON in LTE"; 4G Americas Paper; Oct. 2013 (Year: 2013).*

"Evaluations of LTE Automatic Neighbor Relations"; Dahlen et al.; 2011 IEEE 73rd Vehicular Technology Conference (VTC Spring); Jul. 18, 2011 (Year: 2011).*

Universal Mobile Telecommunications System (UMTS); Radio Resource Control (RRC); Protocol specification (3GPP TS 25.331 version 13.1.0 Release 13); Mar. 2013 (Year: 2013).*

"Automatic Neighbor Relations (ANR) in 3GPP NR"; Ramachandra et al.; 2018 IEEE Wireless Communications and Networking Conference Workshops (WCNCW): 7th International Workshop on Self-Organizing Networks (IWSON) (Year: 2018).*

"3rd Generational Partnership Project; Technical Specification Group Radio Access Network; Automatic Neighbour Relation (ANR) for UTRAN; Stage 2 (Release 15)" 3GPP Standard, Technical Specification, 3GPP TS 25.484, Jul. 2, 2018, pp. 1-20, vol. RAN WG3, No. V15.0.0, XP051474587, 3GPP Organizational Partners, 3rd Generation Partnership Project, France. (20 pages).

Alcatel-Lucent et al., "Logging and Report of ANR Measurements", 3GPP Draft R2-110117, Jan. 10, 2011, pp. 1-3, vol. RAN WG2, XP050492774, 3rd Generation Partnership Project, France. (3 pages).

International Search Report (PCT/ISA/210) and Written Opinion (PCT/ISA/237) dated Nov. 15, 2019, by the European Patent Office as the International Searching Authority for International Application No. PCT/EP2019/079423. (11 pages).

RAN-Meeting RAN2#103bis, Session Chair (Huawei) Chengdu, China, R2-1815603 "Report NB-IoT breakout session" WG2 Meeting report #103bis, paragraph 12.2.6, Oct. 12, 2018 ; retrieved from: https://www.3gpp.org/ftp/tsg_ran/wg2_rl2/TSGR2_103bis/Docs/.

"3rd Generation Partnership Project; Technical Specification Group Radio Access Network" Evolved Universal Terrestrial Radio Access (E-UTRA) and Evolved Universal Terrestrial Radio Access Network (E-UTRAN); Overall description; Stage 2 (Release 15), Sep. 26, 2018.

* cited by examiner

METHOD FOR OPERATING A USER EQUIPMENT SUPPORTING SELF ORGANIZING NETWORKS

CROSS-REFERENCE TO RELATED APPLICATIONS

This application is a National Phase Application of PCT International Application No. PCT/EP2019/079423, International Filing Date Oct. 28, 2019, claiming the benefit of European Patent Application No. 18203099.9, filed Oct. 29, 2018, which are hereby incorporated by reference in their entirety.

FIELD OF THE INVENTION

The present invention relates to a method for a user equipment operating in a cellular network with self-organizing network capabilities. It further relates to a user equipment using said method.

The invention further pertains to method for a base station of a cellular network capable of operating with said user equipment. It further relates to a base station using said method. It further relates to a cellular network comprising said base station.

BACKGROUND OF THE INVENTION

In the field of wireless cellular communication it is known since introduction of Long Term Evolution (LTE, so called $4^{th}$ Generation cellular network, 4G), to simplify the network topology maintenance by means of a new technology called self-organizing network (SON), wherein a newly installed or activated base station is mainly made known to other base stations by means of user equipments retrieving signals from such base stations, in order to establish or update the neighbor base station lists each base station is supposed to maintain.

I.e a user equipment being served by a base station may be requested to scan for newly deployed base stations, in case such base stations are detected and reported to the active base station, the active base station may use said information to establish neighbor cell relations with the newly detected base station. In addition said user equipment preferably provides coverage enhancements means for operation at very low reception levels.

It is therefore known that user equipments camping on a base station provide on request measurement information regarding other base stations of the same operator in reach of the user equipment. For the other base stations typically a cell identifier and a signal strength value, like RSCP (Reference Signal Received Power) is provided to the active base station. This is carried out during operating in connected mode, this included in particular receiving a measurement instruction with physical cell identities (PCI), reporting found cell identities out of said group, and receiving a further instruction for which of the reported PCIs the enhanced cell global identity (ECGI) shall be provided which can be derived by the user equipment by neighbor cell broadcast reading and shall be provided to the active base station. This operation is called Automatic Neighbor Relation (ANR) reporting, typically abbreviated ANR/SON.

With the recently introduced LTE subcategory CAT NB-IoT (narrowband internet of things) however it is envisaged to address user equipments with less resources, preferably both in terms of processing power and power supply. T, in particular how long a battery is supposed to live. Preferably those user equipments are equipped with extreme coverage enhancement means, i.e. by subsequent accumulation of a message including broadcast or dedicated messages base station signals even being 18 dB lower compared to normal coverage can be detected and used to provide a service. Such means when used are very power consuming and rather only applied in case of deep-indoor coverage. Detecting base stations at such low levels is very time consuming and cannot be handled by these resource limited user equipments in parallel to an ongoing connection and also the required gaps for the user equipment would be difficult to predict. Acknowledging this it was already agreed before that NB-IoT shall not conduct or report any neighbor cell measurements in connected mode.

This decision was re-confirmed also for ANR/SON in RAN-meeting RAN2 #103bis (see R2-1815603 "Report NB-IoT breakout session" WG2 Meeting report #103bis, paragraph 12.2.6) that user equipments only may report measurements carried out in idle mode. As a consequence the user equipment will be relapsed to idle, perform the measurement and once again in connected mode report those measurements to the active base station.

Further it is agreed that if possible for reporting it should be avoided that the user equipment wakes up just for transmitting the measured neighbor relation information.

The impact related to the nature of such user equipments i.e. having extreme coverage enhancement means was not discussed and is among others subject of the present invention.

Detection and reporting is supposed to be operable even when operating in enhanced coverage mode, that means up to 2048 repetitions are needed to decode a signal, which extremely drains the battery and that measurements are only executed in idle this impacts the methods for conducting ANR/SON.

These conditions do not allow an ANR implementation as it is defined for legacy user equipments to be applied to NB-IoT user equipments. Furthermore this is in particular disadvantageous, as many of those NB-IoT user equipments are often operating stationary and hence would provide more advantageous information for the SON mechanisms at the base station i.e. which could be used for network optimizations and monitoring impacts of subsequent changes and their impacts on certain areas in the field.

Therefore it requires a solution for allowing such user equipments to be operational for ANR purposes without affecting the battery power to the extent as it would be with the known legacy procedures, and preferably further allow to benefit from the special nature i.e. often being operated stationary.

Further alternative and advantageous solutions would, accordingly, be desirable in the art.

SUMMARY OF THE INVENTION

For this it is according to a first aspect of the invention suggested a method to operate a user equipment according to some embodiments of the present invention. It is further suggested according to a second aspect of the invention a user equipment according to some embodiments of the present invention. According to a third aspect of the invention it is proposed a method for operating a base station according to some embodiments of the present invention. In a fourth aspect of the invention it is suggested a base station according to some embodiments of the present invention. In a fifth aspect of the invention it is proposed a cellular network according to some embodiments of the present invention. According to the first aspect of the invention it is proposed a method for operating a user equipment in a cellular network, the cellular network comprising a plurality of base stations, wherein at least one base station is configured to maintain neighbor relation data, wherein the user equipment is operating with an active base station, which is the one of said base stations the user equipment is currently served by, and the user equipment is configured to operate in narrowband communication category, the method comprising the steps for the user equipment:

- receiving from the active base station a measurement instruction message, said measurement instruction message comprising at least one restriction parameter relating to at least one of a reporting time indication and a minimum power level indicator,
- receiving a connection release message,
- measuring signals from at least one neighbor base station considering the at least one restriction parameter,
- on occasion of a reconnection:
- transmitting at least one neighbor measurement report to the active base station.

The inventive method relates to a user equipment being capable of operating with a base station of a cellular network for wireless communication, in particular those implementing the wireless technology standards of 4G (LTE), 5G (New Radio) or beyond. For such standards it is foreseen to allow user equipments with low capabilities to access the cellular network by offering a narrowband communication category. This is in particular known as LTE category narrowband-IoT (Internet of Things), which comprises for a assigned frequency band to only access a narrow subband, which is in particular operating in another coding scheme than the rest of the frequency band is assigned to. This helps low-capability user equipments to communicate both in uplink and downlink with much less efforts in processing power with a base station of a cellular network of the newest generations. It is already decided to maintain this category also for 5G. However the invention is not limited to 4G or 5G NB-IoT.

However such user equipments might be used for providing information relating to neighbor base stations, in particular those just recently installed in the field. The general procedure is called Self Organizing Networks (SON) in conjunction with Automated Neighbor Relation (ANR), in short ANR/SON. For this purpose said base station maintains a repository with neighbor relation data. This repository is supposed to be fed by neighbor measurement reports from user equipments being served by the respective base station.

For doing so the base station instructs each user equipment to perform measurements on neighbor cells based on a provided Physical Cell Identifier (PCI). The user equipment performs the measurements and reports the detected neighbor cells. This report contains the neighbor base station PCI, but not its enhanced cell global identifier (ECGI). The base station newly instructs the user equipment based on discovered PCIs as parameter to read the ECGI. The user equipment reads the EGCI from the broadcast channel of the respective neighbor base stations. When the UE has found out the new base stations ECGI, the user equipment reports the detected ECGI to the active base station. Besides ECGI further parameters are reported.

For user equipments operating in narrowband category this mechanism needs adaption.

This starts with the assumption that such a user equipment is not supposed to switch to connected resp. dedicated mode in order to submit the result of neighbor measurement.

Consequently the inventive method starts with a user equipment being served by a base station, hereinafter the active base station. Typically the user equipment is camping on the base station, and it is preferably operating in dedicated mode, e.g. in connected mode.

It is generally the base station which drives the process, however the user equipment reacts in the way it is described in the first aspect of the invention. Consequently the inventive method comprises the reception of a measurement instructions message at the user equipment from the base station.

Basically two ways are possible to transmit the measurement instruction message to the user equipment, either via dedicated signalling or via broadcast. Broadcast based signalling would reach more user equipments at once but has severe drawbacks. In NB-IoT (and Cat-M) several features were introduced to reduce the necessity of subsequent reading of the broadcast channel (BCH), in particular extension of the validity time, and an indication in system information (SI) resp. MIB, via change indication, means an indication for changes in SIB1.

With broadcasted instructions the change of the content of the broadcast would impact also user equipments not supporting ANR/SON measurements like legacy devices and user equipments not supporting said feature. In consequence this would be causing all camping user equipments to read the broadcast respectively at least the SIB1 again. In case of MIB indication for the SIB1 these would even mean subsequent reading of SIB1 for entire validity time for all camping user equipments.

Moreover signalling via broadcast channel would also have negative impact on the ANR-feature itself. This is because subsequent changes in the cellular network configuration needs to be spaced at least for a maximum eDRX cycle. Furthermore it would address all user equipments even also those which due to their current position or coverage condition only can contribute little to the ANR/SON network optimization.

Consequently dedicated signalling is preferred, whereas the signalling is valid for only one reporting cycle.

For adapting the general method for user equipments operating in narrowband communication category, the inventive method suggests, that the measurement instruction message at least comprises one restriction parameter.

One option for a restriction parameter is related to a reporting time indication. Due to the fact that the user equipment is operating in idle mode after receiving the measurement instruction message, it is foreseen that the user equipment shall provide its neighbor measurements reports when it connects again. It shall be prevented to connect only for providing the neighbor measurement report, as this could jeopardize the planned power budget for the lifetime of the user equipment.

However, the report might be too late for the requesting base station. A reasonable time for receiving the answer is important from network perspective, as sometimes subsequent configuration tests are done. And otherwise it may take long till all reports concerning certain configuration are received.

However, from user equipments perspective it would be important to combine reporting with the normal next connection establishment, in particular by means of RRC connection setup. Whilst for user equipments which are e.g. subsequently recharged or do not have a limitation on power reporting at shorter time would be feasible.

To solve that contradicting requirements between base station and user equipments it is suggested to include a time in the measurement configuration, in particular the measurement instruction message up to which the cellular network would expect a neighbor measurement report from the user equipment. Preferably the reporting time indication comprises a reporting time limit indicating the time until the neighbor measurement report is expected to be transmitted.

It is not important that all served user equipments of a base station provide such neighbor measurements report, considering the mixture of applications and deployment scenarios there would be a reasonable number of user equipments which have no hard limits or constraints for reporting within said time.

A user equipment which is not able to comply to this reporting time due to its connection cycle shall not perform any related activities. Based on the implementation explicit signaling i.e. configuration reject would be needed here.

This restriction parameter is advantageous as it allows such user equipments with a long cycle for connections to avoid any measurements at all, when it figures out upon reception of the measurement instruction message, that it will not be able to report in the expected time. As user equipments with long connection cycles are those with the tightest (battery) power constraints, these are at the same time those who benefit the most from this feature of the invention.

The second option for a restriction parameter relates to a minimum power level indicator.

The minimum power level indicator is a restriction parameter for the user equipment down to which power value, in particular RSCP or coverage enhancement level the measurements shall be conducted at most.

Performing the measurements and decoding heavily depends on the received signal strength value like RSCP from said measurement instruction message. Just providing the measurement instruction message without the minimum power level indicator would mandate a user equipment to measure and search for said base station(s) up to the minimum possible power level, i.e. in max coverage enhancement with maximum measurement samples/repetitions.

As it is unclear for the base station which user equipment can detect the neighbor base station in normal coverage and which need enhanced coverage means or which would not be able to detect said neighbor base station at all, this restriction parameter shall prevent the latter two user equipments from wasting unnecessary power.

As a simple example, considering a coverage planning for NB-IoT outdoor operation being feasible at normal coverage level, user equipments reporting a base station in extreme coverage would be of no or only limited use.

Not only the decoding, already the measurement may be costly for the user equipment. For network planning the report of a user equipment in deep coverage enhancement may be of little use when a new base station is brought in the field. This would drain a lot of power of user equipments receiving said instruction, especially, if for one of those also the need for decoding the broadcast would be indicated. As a consequence the measurements and decoding shall only be carried out up to a lower boundary provided in the measurement object by the cellular network. The boundary can be i.e. a minRSCP value or max samples to be taken. So any NB-IoT device supporting ANR/SON just would search and report those cells down to the indicated level and would not spend further efforts for finding a base station below said threshold. I.e. a new cell not feasible by a user equipment would cause said user equipment to search for said cell down to maximum possible CE level. This situation needs to be avoided for the envisaged user equipments and is new for such user equipments capable of operating in enhanced coverage mode.

With the suggested solution however, such threat can be overcome.

Preferably the base station provides both restriction parameter in order to put the least impact on the base stations which can benefit from the proposal.

Alternatively the active base station provides only one of the restriction parameter. It is additionally foreseen for the inventive method that the user equipment is capable of managing only one of the types of restriction parameter. It will preferably then ignore the other, if it would be received with the measurement instruction message from the active base station.

The addition of further restriction parameter apart from the mentioned first and second restriction parameter and signaling with the measurement instruction message is further encompassed by the invention.

Additionally it is foreseen to provide a connection release message. With that the base station informs the user equipment about the envisaged end of the current connection, if available. This is to end the dedicated mode and preferably bring the user equipment in idle mode.

According to a preferred embodiment the measurement instruction message and the connection release message are retrieved as part of one transmission. With this embodiment the measurement instruction message is provided together with the connection release message, in particular as part of the connection release message.

With the connection release message a running connection or other dedicated operation mode of the user equipment is ended.

It is advantageous to receive with such message the measurement instruction as it saves additional receiving and decoding efforts.

Consequently after receiving the measurement instruction message, the receiving user equipments starts carrying out the measurements.

This is in particular done after evaluating the received measurement instruction message. In case the evaluation results in a rejection decision it is suggested to reject the measurement instruction message, wherein the rejection decision is based at least on one of:

comparison of the reporting time indication with an activity cycle in place for the user equipment,
detecting that the minimum power indicator is below a predetermined value allowing operation,
detection of a power saving situation,
determination of the type of power supply of the user equipment,
determination of a set of capabilities assigned to the user equipment,
reception of a cancellation message.

With this embodiment the user equipment carries out some checks on the measurement instruction message in order to figure out, if it may be feasible to be carried out. If not a rejection message is send back to the base station. Preferably before the connection release is carried out, the user equipment provides the rejection message to the base station. Alternatively, in particular when the measurement instruction message is received together with the connection release message this is preferably carried out when a new connection is setup again. It is not recommended to setup a new connection only for providing a rejection message.

Preferably the rejection message is part of the neighbor measurement report, which does not provide measurements but only reasons for not measuring.

Among the reasons for rejection it is a comparison of reporting time indication and activity cycle for the user equipment. With this the user equipment can upfront inform the requesting base station that it is not capable of answering such a request in time due to the fact that its own activity cycle governs that the next connection, where a neighbor measurement report could be provided, is way after the expected reporting time. With the rejection message the base station is aware that it may not expect a measurement report from the respective user equipment. If sufficient other user equipments are available that can answer in time, that is, that do not send a rejection message, then the base station may continue without any activity. Otherwise it might modify its expected reporting time and resend the measurement instruction message. In particular for this rejection cause it is suggested that the rejection message preferably comprises a time until next activity.

Another rejection reason might appear upon detection that the minimum power indicator is below a predetermined value allowing operation. This is in particular important for power saving. When the user equipment figures out that it is expected to decode down to a minimum power value that is normally not operated, then it may not well server the base station, even if it might be technically feasible. The predetermined value in particular is calibrated to avoid too much power consumption for measuring neighbor base stations signals. When this value is exceeded through the minimum power value, it is advantageous not to carry out such measurements and provide a rejection message.

Generally when the user equipment is operating in a special power saving mode, or any other power saving situation, it is preferably to avoid making additional measurements. This might be the case for a user equipment installed in a car, where it is expected to be able to receive messages for a given time period in the range of days, powered by the car's battery. At least after a few days the power saving mode might be increased, and every avoidable power consumption tries to be avoided. When now a measurement instruction message is coming in, it is advantageous to reject it instead of consuming more power mainly on behalf of the requesting base station.

Generally when a user equipment figures out that it is operating with a power supply with limited capacity, in particular a battery, this might be sufficient to reject the measurement instruction.

Another option is a comparison with capabilities of the user equipment. If it is not capable—or at least not designated—to carry out such neighbor measurements, it is preferably to provide a rejection message upon reception of the measurement instruction message.

Further a rejection message is preferably submitted when during measurement a cancellation message was received from the base station. This preferably relates to the case that the rejection message is submitted with the next connection event. When in the meantime a cancellation message was received, this is preferably reported to the base station.

After receiving the measurement instruction message, and in particular after evaluating the measurement instruction message in order to figure out if a rejection reason might apply, the user equipment carries out measurements with regards to neighbor base stations, but considering the provided restriction parameter.

That is, only for a certain duration and/or down to a given minimum received power level of transmitted signals the measurements are carried out.

There is potentially the possibility to only measure signals of neighbor base stations. Alternatively it is also possible to decode the broadcast channel (BCH) of at least one neighbor base stations. However from power consumption perspective this increases the power consumption spend for SIB decoding.

According to a preferred embodiment it is suggested that the measurement instruction message comprises a base station identifier relating to a neighbor base station different from the active base station, for that the user equipment is supposed to carry out measurements and to read a broadcast channel transmitted by said neighbor base station.

With this embodiment the active base station instructs the user equipment for which neighbor base station it is expected to decode the BCH. This is in particular advantageous out of power saving purposes, as it relieves the user equipment to decode BCH for all receivable neighbor base stations.

As in legacy there is no need to perform SIB decoding/Enhanced global Cell Identity reporting for all provided PCIs, but for NB-IoT this is now expected. For most of the PCIs related EGCI is clear, only for cases where there is more than one NB-IoT supporting base station in an area having same the same PCI a reporting of the ECGI is necessary.

Once the connection cycle of the user equipment has expired the user equipment is supposed to provide a connection request to the base station, in order to setup a connection. In conjunction with the regular setup connection the user equipment will then transmit its neighbor measurement report to the active base station.

According to another preferred embodiment it is proposed that the neighbor measurement report comprises an indication if at least one of the restriction parameter affected the neighbor measurement report.

With this embodiment it is added the possibility to inform the requesting base station about limitations in the measurement of neighbor base stations.

This relates in particular to a provided reporting time indication. Should the reporting time be exceeded with the connection cycle of the user equipment, it may be carried out the requested measurements. However, due to the reporting time indication the latest measurement may already have taken place a while ago before transmitting the neighbor measurement report to the requesting base station.

In such a case the neighbor measurement report according to this embodiment comprises additionally the indication that the reporting time indication was taken into account and consequently the reported measurements are possibly outdated already.

This is helpful for the active base station in order to correctly handle the received neighbor measurement reports.

The same applies when the measurement instruction message comprised a minimum power level indicator and an identifier of a neighbor base station from which the broadcast is expected to be decoded by the served user equipment, then the user equipment may try to decode signals down to the provided minimum power level indicator. When no such neighbor base station with the provided identifier is found, then this situation is supposed to be reported to the base station, in particular when measurements of other neighbor base stations could successfully be carried out.

User equipments which camp on a base station being at even lower reception level would search for the base station indicated in the measurement instruction message, which have not been measured before up to the reception level of the active base station, i.e. trying to find a better suited cell to camp on. However, this would be rather part of NB-IoT re-selection process and is handled accordingly. For a user equipment it is then to be evaluated if it would carry out a re-selection, or whether a special report would be needed. Consequently it is suggested that a user equipment camping on an active base station with lower reception level than indicated by the measurement object shall try to measure newly indicated base station down to serving cell reception level for cell re-selection purposes.

According to another preferred embodiment it is suggested that in case the received restriction parameter comprises a minimum power level, the method comprises the step of:

considering said minimum power level indicator when measuring signals from at least one neighbor base station in dependence of signals received from said neighbor base station at the user equipment, wherein the measurement attempt is terminated when said minimum power level is reached without detecting signals from at least one neighbor base station.

With this embodiment it is assured that the minimum power level provided with the measurement instruction message as one of the proposed types of restriction indication, is advantageously used by the user equipment. Hence, when with the considering the provided minimum power level no neighbor base station, in particular no neighbor base station indicated in the measurement instruction message could be found, then the user equipment will stop measuring.

In particular when operating in enhanced coverage a further reduction of the expected signal power level from neighbor base stations through plenty of repetitions would increase the power consumption just for measuring. This is avoided with this embodiment.

Preferably the user equipment reports in the neighbor measurement report resp. a rejection report about the situation that the restriction indication, in particular the restriction indication of the minimum power level, was reached without a signal.

According to another preferred embodiment it is suggested that in case the received measurement instruction provides no minimum power level indicator, the method comprises the step of considering a predefined default minimum power level regarding received signals from at least one neighbor base station in particular in dependence of coverage conditions of the user equipment, wherein the neighbor measurement report comprises the indication that the minimum power level was considered.

With this embodiment the user equipment which is operating in enhanced coverage takes into consideration the minimum power level, even if not provided with the measurement instruction message.

This embodiment copes with the question whether user equipments supporting ANR/SON measurements also could support them only down to a certain level, i.e. without coverage enhancements (normal mode) up to the full range.

Hence it is suggested that a user equipment may perform SON/ANR searches only down to a certain minimum reception level. Said level could last from normal coverage down to support of measurements to maximum Coverage Enhancement (CE) level.

Means it is introduced one fixed default value agreed to be applicable for all measurements in ANR/SON context. Such default value could be predefined as e.g. meaning a minimum power level alike only normal coverage, resp. to a certain CE level. This embodiment saves signalling of the minimum power level with the measurement instruction message.

According to another preferred embodiment it is suggested that the neighbor measurement report comprises at least one parameter for at least one neighbor base station out of the group of:

reception level of signals from said neighbor base station,
timestamp of measurement of the reception level,
decoded global base station identifier of said neighbor base station,
indication about accessibility of said neighbor base station,
indication about being a user equipment operating stationary,
indication about being a user equipment operating in deep indoor status,
indication about being a user equipment operating in coverage enhancement mode and/or coverage enhancement level.

With this embodiment it is proposed which parameter a measurement report may comprise, depending at least upon the configuration, the measurement request message and the capabilities of the user equipment.

The main content of the neighbor measurement report is the reception level of signals from neighbor base stations, in particular one, in particular the one depicted in the measurement request message.

This is the one information the requesting base station is mainly interested in, in order to get an impression about the proximity and if this base station is capable of being a neighbor base station, in the sense that a served user equipment might be handed over to said measure base station.

Additionally the time stamp of the measurement is useful in order to know for the active base station, how up to date such measurement is.

Mainly for the identified base station in the measurement request it is of interest the decoded global base station identifier. For this the user equipment would need to decode the broadcast resp. SIBs, in order to figure that out. In particular when the PCI is not unique, and the ECGI is not known to the active base station this information is helpful to complete the stored data.

The indication about accessibility of said neighbor base station relates to the question if a decodable neighbor base station is addressed to be accessible for all user equipments, or potentially barred for some user equipments. This might be due to the base station indicating a closed subscriber group (CSG). Additionally a barring of certain types of user equipments, e.g. machine type communication devices might be available, as well as those operating in a certain coverage enhancement level (CE level)

This information is provided in the SIB broadcast and can be decoded by the user equipment and consequently also reported in the neighbor measurement report.

With the following parameter the user equipment is capable to inform the base station about characteristics of the user equipments environment and installation.

The information if the user equipment is operating stationary is of utmost relevance for the base station. A stationary user equipment is effectively—at least for a given period of time—not moving, and hence a change of its reception conditions have their reason in other circumstances than a spatial movement.

Certain time may have elapsed when the reporting from the user equipment is carried out. Also a cellular network may want to perform subsequent tests, hence those user equipment which are "stationary" may be of special interest for the network when reporting. As the impact of adjustment could be visible here right away for comparison. Not to cause here any extra efforts to the user equipment this should be restricted to an indication for a user equipment whether it has been stationary during carrying out said measurements. Easiest way is for user equipments supporting also relaxed measurements for static user equipments, when from the time the user equipment has received the measurement instruction till the time the report was provided the defined criteria according TS36.304 was fulfilled, in said case the user equipment could indicate that within the neighbor measurement report.

Consequently it is suggested that a user equipment having knowledge on being stationary (being also capable of relaxed measurement operation) could indicate whether the related requirement i.e. being stationary was fulfilled, whilst doing said measurements and decoding. This is supposed to be submitted to the active base station.

According to a preferred embodiment it is proposed the step of receiving an updated measurement instruction message from the active base station in response to transmitting the measurement report message comprising a stationary indication of the user equipment.

With this embodiment an updated measurement instruction message is provide to at least one served user equipment.

This is the suggested for the case when the user equipment is operating stationary. This allows for the base station to adapt its transmission configuration, in particular antenna angles etc., and/or encourage the newly setup neighbor base station to adapt its transmission configuration. Means each time the cellular network performs an adaption of a base station or brings in a certain area a base station in the field it may give a new measurement task by the pre-described model to the stationary user equipment and receives a corresponding report which when compared with the previous report shows exactly the impact of the change in said position.

As set out above with the user equipment being stationary such fine tuning is possible and more accurate measurements are to be expected, in particular over the time.

Should a user equipment stop being stationary, then it preferably submits in a neighbor measurement report a respective indication about a change of that stationary status.

In another preferred embodiment it is proposed the step of receiving an updated measurement instruction message from the active base station in response to transmitting the rejection message comprising a rejection reason or transmitting said neighbor measurement report.

With this embodiment likewise an updated measurement instruction message is provide to at least one served user equipment. Preferably the rejection reason is then taken into account by the base station and consequently other modified parameter of the measurement instruction message appear.

For the user equipment this measurement instruction is handled accordingly, that is, it is evaluated and the measurements are carried out and reported upon the next connection occasion, provided no rejection reason may be detected, in particular during the step of evaluation.

In addition it may also be interesting for the cellular network when a user equipment reports whether it is operating deep indoor. This means a user equipment having knowledge on being deep indoor, (here indoor means facing larger attenuation by walls), could also indicate this to the cellular network resp. base station. For the user equipment this is not complicated to figure that out as it knows the maximum coupling loss (MCL) to the active base station and the applied Timing-Advance value (TA). Both can be translated in a virtual distance, and compared to result from calculation MCL from Line of Sight (LOS) formula for the used frequency. If there is a larger deviation, the user equipment can itself consider to be deep indoor. In simple words if coupling loss is large but TA small, the user equipment is indoor. The well-known effect in TDD is considered in GP between DWPTS and UPPTS.

Hence it is suggested that the user equipment shall indicate in the neighbor measurement reports—or a rejection message—whether it is currently deep indoor or not, provided it has corresponding knowledge.

According to the second aspect of the invention it is proposed a user equipment configured for operating in a cellular network, the cellular network comprising a plurality of base stations, wherein at least one base station is configured to maintain neighbor relation data, wherein the user equipment is operating with an active base station, which is the one of said base stations the user equipment is currently served by, and the user equipment is configured to operate in narrowband communication category, wherein the user equipment is configured to:

receive from the active base station a measurement instruction message, said measurement instruction message comprising at least one restriction parameter relating to at least one of a reporting time indication and a minimum power level indicator, receive a connection release message, measure signals from at least one neighbor base station considering the at least one restriction parameter, on occasion of a reconnection:

transmit at least one neighbor measurement report to the active base station.

The user equipment provides a couple of components for conducting wireless communication. This comprises at least processing circuitry for executing operation software, in particular those implementing the method of the first aspect of the invention.

Further the user equipment comprises transmitting and receiving circuitry in connection with at least one antenna, typically a transceiver for exchanging wireless communication signals with a base station of the cellular network. Further a memory unit for volatiles and/or permanent storage of executable software, configuration data and measured data e.g. before transmitting as part of a neighbor measurement report.

The second aspect of the invention shares the advantages of the first aspect of the invention.

According to the third aspect of the invention it is suggested a method for a base station of a cellular network, configured for serving at least one user equipment being served by said base station and operating in narrowband communication category, the base station further maintaining a set of neighbor relationship data relating to neighbor base stations, comprising the steps of:

transmitting to said at least one user equipment a measurement instruction message, said measurement instruction message comprising at least one restriction parameter relating to at least one of a reporting time indication and a minimum power level indicator, transmitting a connection release message, in conjunction with again setting up a connection in response to a connection setup request from the user equipment:

receiving at least one neighbor measurement report,
updating the neighbor relationship data based on said neighbor measurement report.

According to this aspect a base station is the beneficiary and initiator of the neighbor base station measurement. Hence, for solving the addressed problem of applying the SON/ANR feature to NB-IoT, it is expected that also the base station plays its part.

The base station is one of a plurality of base station of the cellular network, and configured to implement the technology standard of 4G or 5G. Further it is capable of operating in narrowband communication category, that is NB-IoT. The base station is in particular triggered through a message from the cellular network that in proximity a new base station is installed in the field. Consequently it instructs the served user equipments to carry out measurements in order to find out if the new base station is decodable by the camping user equipments, and is really a "neighbor" base station, in that sense, that a camping user equipment might make a cell reselection or handover to.

Hence it is suggested in this method that the base station provides with the measurement instruction the respective parameter for allowing the addressed user equipments to carry out the requested neighbor base station measurement, however but taking into account their power budget. This helps the base station to acquire sufficient user equipments to carry out such measurements.

When the neighbor measurement reports are received the neighbor relationship data are updated based on such data. Such data include an indication relative to the measured at least one neighbor base station. Such data are then considered for updating the neighbor relationship data for that neighbor base station.

In particular when a new base station is put into the field, as preferably indicated by the cellular network, then new measurements for this new base station is expected from the instructed user equipments.

Should none of them be able to decode signals from this respective newly installed base station, it might be advantageous for the base station to instruct a subset of the user equipments, in particular those with sufficient power supply, and/or operating stationary, to carry out another measurement, but with a modified minimum power level indicator. This allows less power aware user equipments to carry out measurements, even in enhanced coverage mode to listen to signals of that new base station, which could not be decoded with the minimum power level indicator which was provided with the previous measurement instruction message.

Alternatively or additionally it is suggested in another preferred embodiment the steps of:
retrieving in response to said measurement instruction message at least one of a rejection message comprising a rejection reason or a neighbor measurement report with at least one of a stationary indicator or said indication of affected restriction parameter,
transmitting an updated measurement instruction message taking into account said received message.

With this embodiment in particular a rejection message or an indication that a user equipment is operated stationary lead to an evaluation at the base station, in order to transmit an updates measurement instruction message to at least a subset of such user equipment which are sending the rejection message resp. the stationary indicator with the neighbor measurement report.

Preferably a neighbor measurement report without measurements, but with a rejection indication is defined as being a rejection message. Even with regards to the failure of decoding the BCH of a defined base station, but with successful measurements of other neighbor base station, in one neighbor measurement report likewise a rejection indication might be transmitted.

According to the fourth aspect of the invention it is further proposed a base station of a cellular network, configured for serving at least one user equipment being served by said base station and operating in narrowband communication category, the base station further maintaining a set of neighbor relationship data relating to neighbor base stations, wherein the base station is configured to:
transmit to said at least one user equipment a measurement instruction message, said measurement instruction message comprising at least one restriction parameter relating to at least one of a reporting time indication and a minimum power level indicator,
transmit a connection release message, in conjunction with again setting up a connection in response to a connection setup request from the user equipment:
receive at least one neighbor measurement report,
update the neighbor relationship data based on said neighbor measurement report.

The base station according to this aspect of the invention is communicatively coupled with other components of a cellular network, in particular one according to the technology standard of 4G, 5G, or beyond. In regards to this standards the base station is usually depicted as eNB resp. gNB.

It provides transmitting and receiving circuitry, together with at least one antenna. Further it comprises processing circuitry for executing operating software, in particular implementing the method of the third aspect of the invention.

The fourth aspect of the invention shares the advantages of the previous aspects of the invention, in particular the third aspect.

According to the fifth aspect of the invention it is proposed a cellular network for wireless communication, comprising a plurality of base stations according to the fourth aspect of the invention, said cellular network being configured to maintain billing records for each subscriber to the cellular network, wherein the cellular network is further configured to retrieve at least one indication from at least one base station relating to received neighbor measurement reports of a user equipment of a subscriber, and in response to amend the set of billing records for said subscriber in terms of a credit record.

Generally the cellular network is operated by a network operator, and comprises a plurality of base stations according to the fourth aspect of the invention, as well as a plurality of core components and databases.

For improvement of the network coverage, resp. addressing changes in usage intensity, e.g. if a new shopping mall was built on an by now empty field, new base stations are installed.

For achieving a seamless integration in the already existing cellular network, in particular the base stations, preferably for allowing useful handover resp. reselection procedures, the cellular network provides an information to potential neighbor base stations, that a new base station is setup. This triggers the base stations to initiate the ANR/SON mechanism.

However, for the case of NB-IoT user equipments it might be hard to impel such user equipments to carry out such neighbor measurements and provide the neighbor measurement reports.

According to this aspect of the invention it is therefore suggested to preserve a compensation for cooperative user equipments. Such compensation is in particular relating to billing of payload transmissions.

Consequently billing records that appeared are amended in the sense of changing the value, deleting or adding credit records in the amount of the envisaged compensation.

In particular NB-IoT capable user equipments are typically more aware of their power budgets due to the limited resources. Hence in exchange for cost savings for data transmissions, the cellular network according to this aspect of the invention will assure that a sufficiently large amount of user equipments operating in narrowband communication category, in particular NB-IoT, will provide over the cellular network area sufficient neighbor measurement reports.

As it is shown this invention advantageously solves the depicted problem and offers a solution for enhancing the feature of ANR/SON to narrowband communication category capable user equipments.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a user equipment UE of the legacy type, typically a common handset, which is supposed to operate with a base station $eNB_A$, of a cellular network CN. Hence base station $eNB_A$ is the active base station for the user equipment.

With a legacy user equipment the ANR procedure works as shown:

The active base station $eNB_A$ is capable of initiating the ANR function. As a part of the normal call procedure, the base station instructs user equipment UE to perform measurements on neighbor base station, in particular $eNB_B$. This might in particular due to an indication received from the cellular network CN, that a new base station $eNB_B$ is installed and put into operation.

The active base station may use different policies for instructing the user equipment to do measurements, and when to report them back. This is the general 4-step procedure according to legacy standards.

It is in particular initiated when the active base station $eNB_A$ receives a measurement report containing the PCI of a neighbor base station, here PCI=5, see message M1.

With message M2 the active base station eNBA instructs the user equipment UE, using the newly discovered PCI as parameter, to read the ECGI, the tracking area code (TAC) and all available PLMN ID(s) of the related neighbor cell. The active base station provides only those PCIs where it is interested in the corresponding ECGI. To do so, the active base station eNBA may need to schedule appropriate idle periods to allow the user equipment UE to read the ECGI, here=19 from the broadcast channel of the a detected neighbor base station. The ECGI is in particular part of the system information, as concatenation of MCC, MNC and CGI.

When the user equipment UE has found out the new cell's ECGI, the user equipment UE reports with Message M3 the detected ECGI to the active base station eNBA. In addition the user equipment UE reports the tracking area code and all PLMN IDs that have been detected. If the detected cell is a CSG (means closed subscriber group) or hybrid cell, the UE also reports the CSG ID to the active cell eNBA. Whether the new neighbor base station is open for all users or a CSG cell or whether it belongs to same or different area are additional information which are important for the cellular network. These information can be similarly used for NB-IoT ANR/SON, and in addition there are also further parameter specific for NB-IoT which can be reported by the user equipment in addition, such as indication whether the user equipment being stationary.

The active base station eNBA decides to add this neighbor relation to its neighbor relationship data, as part of Message M4.

In the following active base station eNBA can use received PCI (physical cell identifier) and ECGI (enhanced cell global identifier) to lookup a transport layer address to the new neighbor base station, update the Neighbor Relation List, and if needed, setup a new X2 interface towards this eNB.

Figure 1:
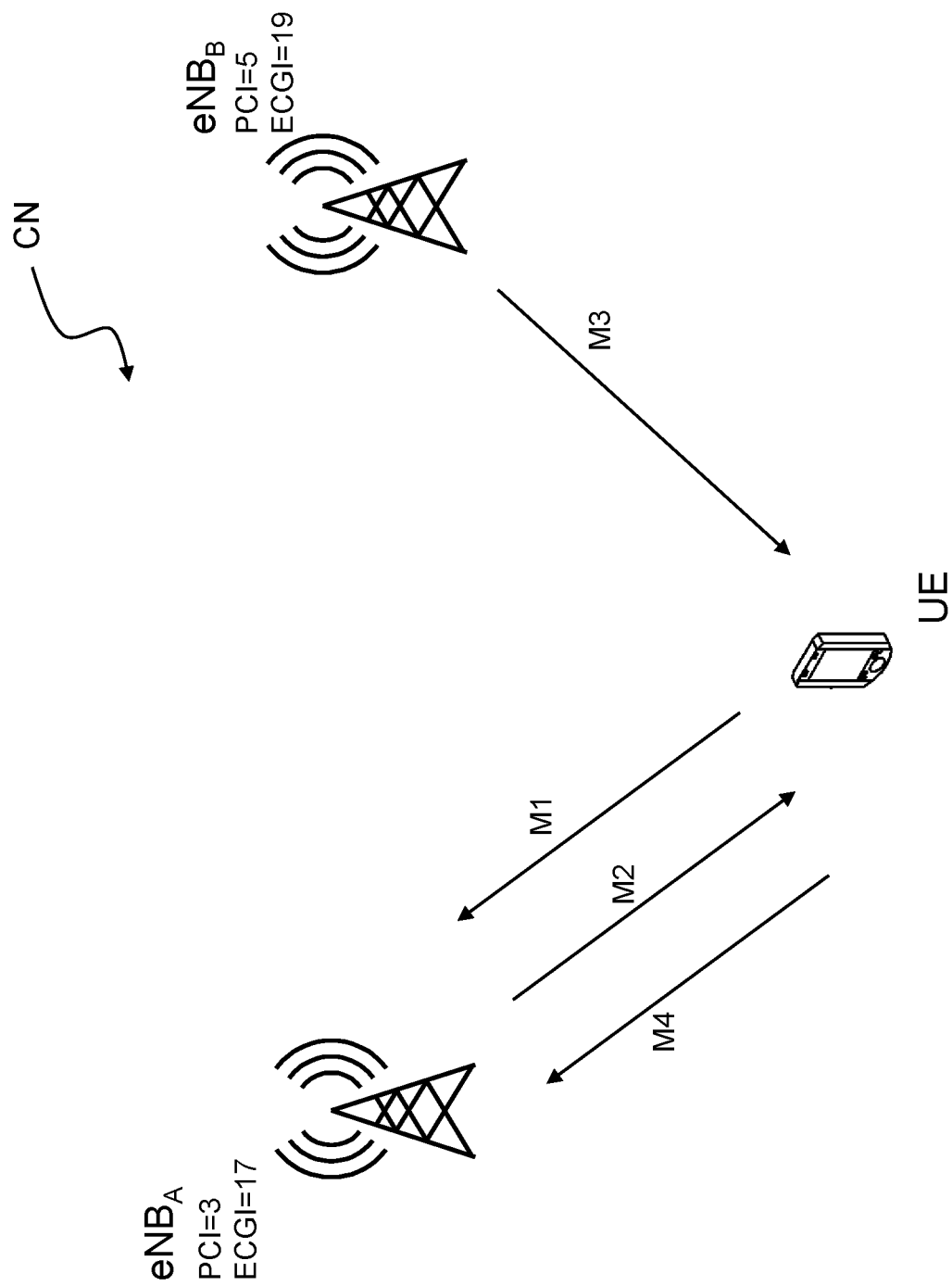
FIG. 1 represents a user equipment of the type to which the present invention is applied according to the prior art.
Figure 2:
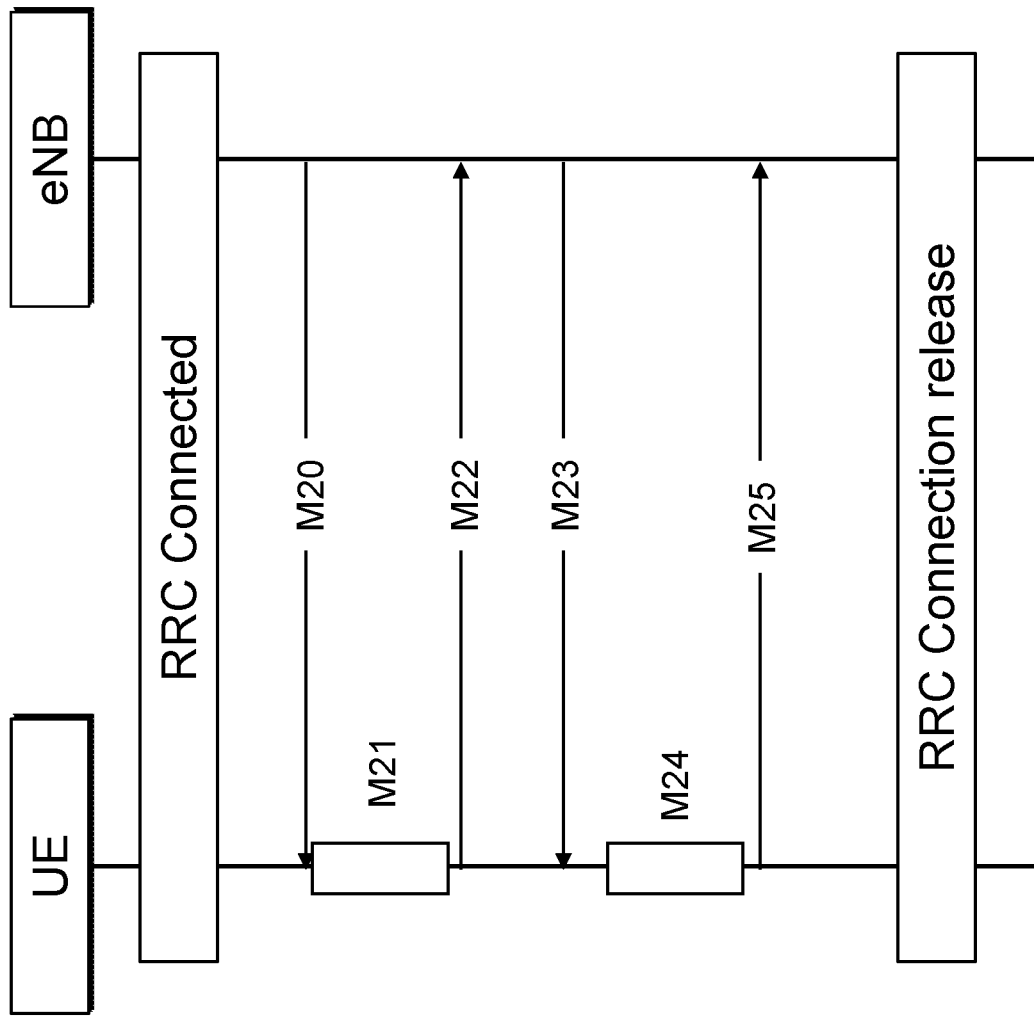
FIG. 2 represents a sequence diagram of the ANR/SON procedure according to the prior art.

In the sequence diagram of FIG. 2 it is shown how the ANR operation for legacy device is carried out. It is based on the situation that the user equipment is permanently connected during the ANR operation phase.

With message M20 the active base station eNB instructs the user equipment to carry out neighbor base station measurements. This message may include the PCI of a specific neighbor base station the active base station eNB is interested in.

In the phase M21 the measurement is carried out by the user equipment UE. Consequently a measurement report M22 comprising RCSP values and the PCI of the detected at least one base station for which measurements could be carried out.

As the operation is carried out during connected mode, the user equipment may immediately after the measurements have concluded provide the message M22.

In response the active base station eNB sends a further request M23 comprising at least one PCI for which the base station wants to retrieve the ECGI. This is for certain situations needed when a too large area is covered and consequently the PCI may not be unique anymore. Or the depicted base station is not known to the active base station and it wants to setup an X2 interface for which the global cell ID ECGI is needed. The ECGI is unique, but requires additional effort for the user equipment to figure it out.

Hence the user equipment needs in step M24 to decode the BCH and read the SIB1 of the neighbor base station in order to retrieve the ECGI.

With message M25 the ECGI report is provided to the active base station eNB. This is immediately after retrieving the ECGI possible, as the user equipment is still operating in connected resp. dedicated mode.

Afterwards the connection may be released.

However it is not possible to apply that legacy procedure to the status of a user equipment operating in narrowband, in particular NB-IoT, mainly because it is not supposed to connect or remain connected for making the measurements and providing the results. The four step procedure of FIG. 2 is therefore not applicable anymore.

Figure 3:
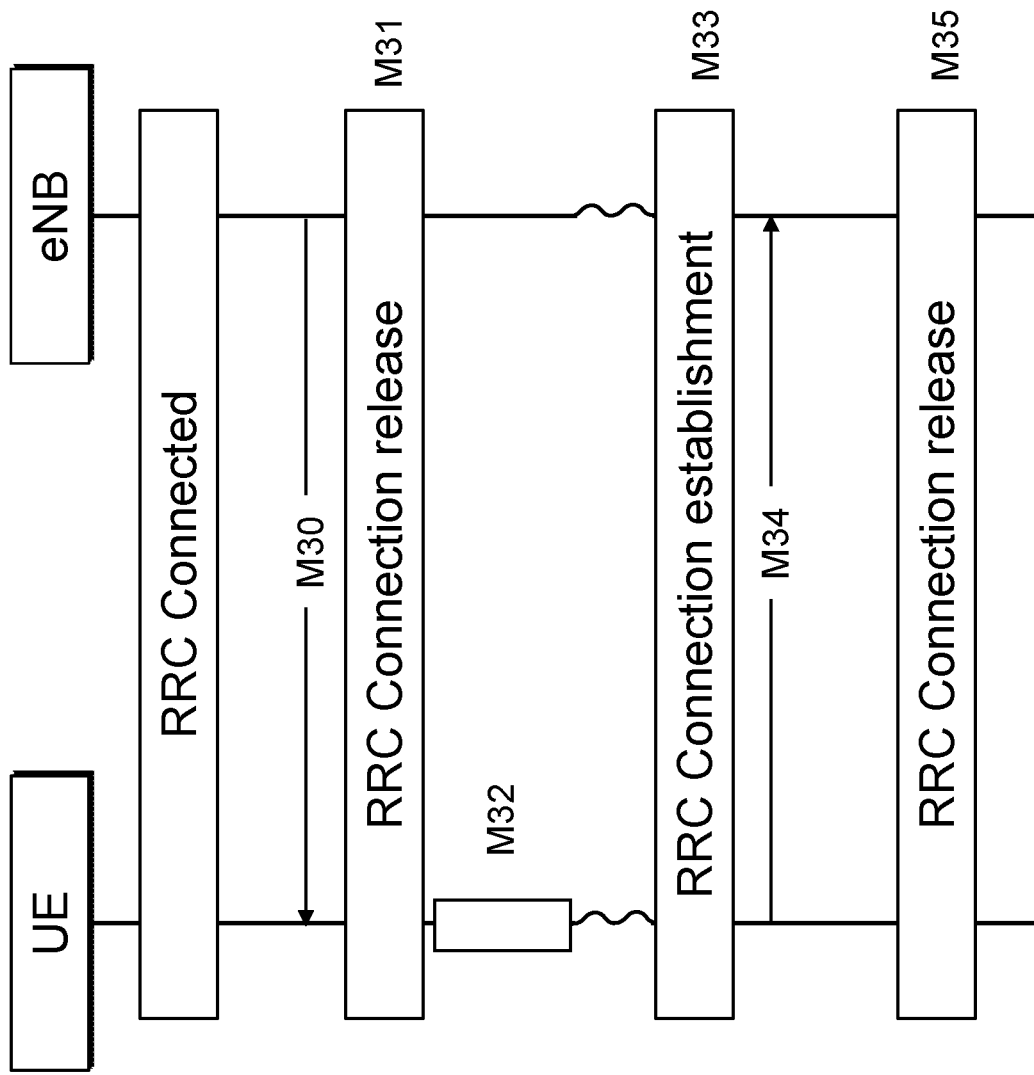
FIG. 3 represents a sequence diagram of the ANR/SON procedure for narrowband communication according to an exemplifying embodiment of the invention.

FIG. 3 shows an embodiment of the inventive solution for this problem.

The scenario is the same as above, a user equipment UE being served by a base station eNB, which is hence the active base station. The user equipment in particular has a connection cycle of a regular schedule, e.g. once an hour or in 24 hours. During that connection the user equipment UE is capable of transmitting data, e.g. measurements of a e-meter or any other type of sensor, filling level of vending machines, or the like.

After such data transmission in connected mode the shown procedure starts. During this phase the active base station eNB may transmit a measurement instruction message M30 to the user equipment UE.

Preferably the measurement instruction message comprises at least one PCI of a user equipment, e.g. which is recently put into operation in the same tracking area as the base station eNB. Further parameter are transmitted, in particular a restriction parameter, which may be a reporting time indication and or a minimum power level indicator.

The user equipment checks the received message and either rejects it, e.g. due to the provided parameter, or as it is not capable of carrying out such measurements, e.g. due to being operated in a power saving mode.

The rejection is preferably transmitted as a rejection message (not shown) while being connected.

This is in particular possible as in this exemplifying embodiment the connection release message M31 is provided after the measurement instruction message M30. In another not shown embodiment both messages are submitted as one message. Then the rejection message would be transmitted during the next connection cycle.

When no rejection decision is made, the user equipment carries out measurements in step M32 of at least one neighbor base station, in particular the one depicted with the PCI provide with measurement instruction message M30. Hence it may still be the case the user equipment is not able to retrieve any signals from the depicted or any other base station, in particular due to the provided minimum power level indicator.

After the measurement is concluded the neighbor measurement results cannot directly be transmitted, as the user equipment is operating in idle mode now. To build up a connection just for submitting the neighbor measurements is power-wise not justifiable for the majority of the envisaged user equipments. Hence it needs to wait for the connection cycle to reach the time, when the next connection establishment M33 is carried out. This time gap is indicated by the wavy line sections.

Once the connection is established the neighbor measurement report M34 is transmitted to the active base station eNB.

The neighbor measurement report comprises in this exemplifying embodiment besides the RSCP values of neighbors depicted by its ECGI, but also an indication about being stationary, or that one of the restrictions of the measurement instruction message M30 applied.

In response the base station eNB may decide to send an updated measurement instruction message (not shown), and afterwards initiated a connection release with message M35.

In the normal course of exemplifying embodiment of the inventive method however the base station received the neighbor measurement reports and updates the neighbor relationship records maintained in the base station.

It is obvious that the exemplifying embodiment fulfills the conditions for ANR procedures also for low resource user equipments operating in NB-IoT.

With the restriction parameter as parameter of the measurement instruction message the user equipment may align the measurements to the local needs, in particular relating to power consumption.

Figure 4:
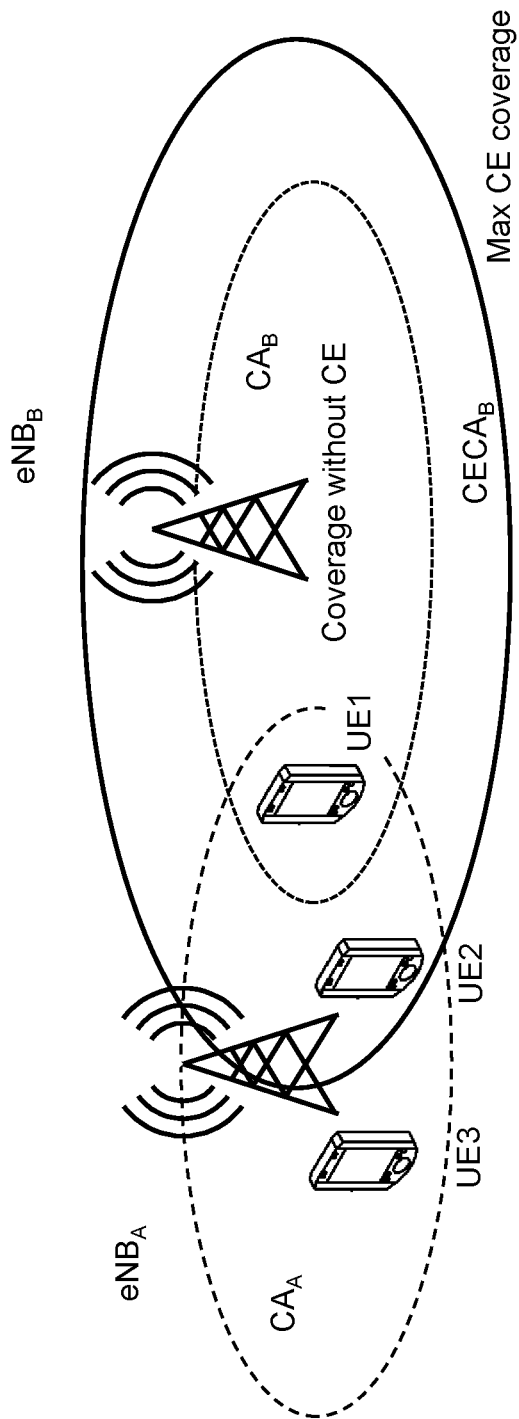
FIG. 4 represents a the coverage situation for a couple of user equipments according to another exemplifying embodiment of the invention.

This becomes obvious for the restriction parameter of the minimum power level indicator as shown in FIG. 4.

Here are shown two base stations $eNB_A$ and $eNB_B$, with three user equipments UE1, UE2, UE3 being served by base station $eNB_A$.

When base station $eNB_B$, which is as well as base station $eNB_A$ capable of supporting NB-IoT, is brought into the field, the base station $eNB_A$ is requesting ANR/SON measurements from user equipments located in the coverage area $CA_A$ of base station $eNB_A$. $eNB_A$ has so far no knowledge on the area which may be covered by $eNB_B$, it may so far not even be aware of its presence as such.

As it can be seen, user equipment UE1 can detect signals from base station $eNB_B$ in reasonable level, due to the fact that it is located in the coverage area $CA_B$ of base station $eNB_B$. User equipment UE2 could detect base station $eNB_B$ only when using maximum coverage extension, as it is operated in the area of maximum CE coverage $maxCECA_B$.

User equipment UE3 will not see the new base station base station $eNB_B$ at all. Would user equipment UE3 try to detect the new base station down to its maximum CE capability, this would cost a lot of power and still would be in vain.

Due to the possibility of NB-IoT devices to scan down to very low levels in coverage enhancements, ANR/SON needs to have a restriction here, as not all indicated base station should be scanned to lowest levels and decoded. This would heavily impact power consumption in the user equipment and also corresponding acceptance of that feature.

This issue is solved with present invention as it can be seen with the shown exemplifying embodiment.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for operating a user equipment in a cellular network, the cellular network comprising a plurality of base stations, wherein at least one base station is configured to maintain neighbor relation data, wherein the user equipment is operating with an active base station, which is the one of said base stations the user equipment is currently served by, and the user equipment is configured to operate in narrowband communication category, the method comprising the steps for the user equipment:

receiving from the active base station a measurement instruction message, said measurement instruction message comprising at least one restriction parameter relating to at least one of a reporting time indication and a minimum power level indicator,
receiving a connection release message,
measuring signals from at least one neighbor base station considering the at least one restriction parameter, and on occasion of a reconnection:
transmitting at least one neighbor measurement report to the active base station;
wherein the measurement instruction message and the connection release message are retrieved as part of one transmission.

2. The method according to claim 1, wherein the neighbor measurement report comprises an indication in response to at least one of the restriction parameter affected the neighbor measurement report.

3. The method according to claim 1, wherein the neighbor measurement report comprises at least one parameter for at least one neighbor base station out of the group of:
reception level of signals from said neighbor base station,
timestamp of measurement of the reception level,
decoded global base station identifier of said neighbor base station,
indication about accessibility of said neighbor base station,
indication about being a user equipment operating stationary,
indication about being a user equipment operating in deep indoor status,
indication about being a user equipment operating in coverage enhancement mode and/or coverage enhancement level.

4. A method for operating a user equipment in a cellular network, the cellular network comprising a plurality of base stations, wherein at least one base station is configured to maintain neighbor relation data,
wherein the user equipment is operating with an active base station, which is the one of said base stations the user equipment is currently served by, and the user equipment is configured to operate in narrowband communication category,
the method comprising the steps for the user equipment:
receiving from the active base station a measurement instruction message, said measurement instruction message comprising at least one restriction parameter relating to at least one of a reporting time indication and a minimum power level indicator,
receiving a connection release message,
measuring signals from at least one neighbor base station considering the at least one restriction parameter, and on occasion of a reconnection:
transmitting at least one neighbor measurement report to the active base station,
wherein in case the received restriction parameter comprises a minimum power level, the method comprises the step of:
considering said minimum power level indicator when measuring signals from at least one neighbor base station and signals received from said neighbor base station at the user equipment,
wherein the measurement is terminated when said minimum power level is reached without detecting signals from the at least one neighbor base station.

5. A method for operating a user equipment in a cellular network, the cellular network comprising a plurality of base stations, wherein at least one base station is configured to maintain neighbor relation data,
wherein the user equipment is operating with an active base station, which is the one of said base stations the user equipment is currently served by, and the user equipment is configured to operate in narrowband communication category,
the method comprising the steps for the user equipment:
receiving from the active base station a measurement instruction message, said measurement instruction message comprising at least one restriction parameter relating to at least one of a reporting time indication and a minimum power level indicator,
receiving a connection release message,
measuring signals from at least one neighbor base station considering the at least one restriction parameter, and on occasion of a reconnection:
transmitting at least one neighbor measurement report to the active base station,
wherein the measurement instruction message comprises a base station identifier relating to a neighbor base station different from the active base station that the user equipment is supposed to carry out measurements for and to read a broadcast channel transmitted by said neighbor base station.

6. A method for operating a user equipment in a cellular network, the cellular network comprising a plurality of base stations, wherein at least one base station is configured to maintain neighbor relation data,
wherein the user equipment is operating with an active base station, which is the one of said base stations the user equipment is currently served by, and the user equipment is configured to operate in narrowband communication category,
the method comprising the steps for the user equipment:
receiving from the active base station a measurement instruction message, said measurement instruction message comprising at least one restriction parameter relating to at least one of a reporting time indication and a minimum power level indicator,
receiving a connection release message,
measuring signals from at least one neighbor base station considering the at least one restriction parameter, and on occasion of a reconnection:
transmitting at least one neighbor measurement report to the active base station, and further comprising the steps of:
evaluating the measurement instruction message,
in case the evaluation results in a rejection decision:
rejecting the measurement instruction message,
wherein the rejection decision is based at least on one of:
comparison of the reporting time indication with an activity cycle in place for the user equipment,
detecting that the minimum power indicator is below a predetermined value allowing operation,
detection of a power saving situation,
determination of the type of power supply of the user equipment,
determination of a set of capabilities assigned to the user equipment,
reception of a cancellation message.

7. The method according to claim 6, further receiving an updated measurement instruction message from the active base station in response to transmitting the rejection message comprising a rejection reason or transmitting said neighbor measurement report.

8. The method according to claim 6, further receiving an updated measurement instruction message from the active base station in response to transmitting the measurement report message comprising a stationary indication of the user equipment.

9. A user equipment configured for operating in a cellular network, the cellular network comprising a plurality of base stations, wherein at least one base station is configured to maintain neighbor relation data,
wherein the user equipment is operating with an active base station, which is the one of said base stations the user equipment is currently served by, and the user equipment is configured to operate in narrowband communication category,
wherein the user equipment comprises a memory and a processor, the user equipment being configured to:
receive from the active base station a measurement instruction message, said measurement instruction message comprising at least one restriction parameter relating to at least one of a reporting time indication and a minimum power level indicator,
receive a connection release message,
measure signals from at least one neighbor base station considering the at least one restriction parameter, and on occasion of a reconnection:
transmit at least one neighbor measurement report to the active base station wherein the measurement instruction message and the connection release message are retrieved as part of one transmission.

10. The user equipment according to claim 9, further configured to add to the neighbor measurement report an indication if at least one of the restriction parameter affected the neighbor measurement report.

11. A method for a base station of a cellular network, configured for serving at least one user equipment being served by said base station and operating in narrowband communication category, the base station further maintaining a set of neighbor relationship data relating to neighbor base stations, comprising the steps of:
transmitting to said at least one user equipment a measurement instruction message, said measurement instruction message comprising at least one restriction parameter relating to at least one of a reporting time indication and a minimum power level indicator,
transmitting a connection release message,
in conjunction with again setting up a connection in response to a connection setup request from the user equipment:
receiving at least one neighbor measurement report,
updating the neighbor relationship data based on said neighbor measurement report, and further comprising the steps of:
retrieving in response to said measurement instruction message at least one of a rejection message comprising a rejection reason or a neighbor measurement report with at least one of a stationary indicator or said indication of affected restriction parameter,
transmitting an updated measurement instruction message taking into account said received message.

12. The method according to claim 11, wherein the neighbor measurement report comprises an indication if at least one of the restriction parameter affected the neighbor measurement report.

13. A method for a base station of a cellular network, configured for serving at least one user equipment being served by said base station and operating in narrowband communication category, the base station further maintaining a set of neighbor relationship data relating to neighbor base stations, comprising the steps of:
transmitting to said at least one user equipment a measurement instruction message, said measurement instruction message comprising at least one restriction parameter relating to at least one of a reporting time indication and a minimum power level indicator,
transmitting a connection release message,
in conjunction with again setting up a connection in response to a connection setup request from the user equipment:
receiving at least one neighbor measurement report,
updating the neighbor relationship data based on said neighbor measurement report, wherein the measurement instruction message and the connection release message are transmitted as part of one transmission.

14. A base station of a cellular network, configured for serving at least one user equipment being served by said base station and operating in narrowband communication category, the base station further maintaining a set of neighbor relationship data relating to neighbor base stations, wherein the base station is configured to:
transmit to said at least one user equipment a measurement instruction message, said measurement instruction message comprising at least one restriction parameter relating to at least one of a reporting time indication and a minimum power level indicator,
transmit a connection release message,
in conjunction with again setting up a connection in response to a connection setup request from the user equipment:
receive at least one neighbor measurement report,
update the neighbor relationship data based on said neighbor measurement report and further configured to:
retrieve in response to said measurement instruction message at least one of a rejection message comprising a rejection reason or a neighbor measurement report with at least one of a stationary indicator or said indication of affected restriction parameter,
transmit an updated measurement instruction message taking into account said received message.

15. A cellular network for wireless communication, comprising a plurality of base stations, wherein each of the plurality of base stations is according to claim 14, said cellular network being configured to maintain billing records for each subscriber to the cellular network,
wherein the cellular network is further configured to retrieve at least one indication from at least one base station relating to received neighbor measurement reports of a user equipment of a subscriber,
and amend the set of billing records for said subscriber in terms of a credit record.

* * * * *